INVENTOR
BENGT ERLAND ILON

BY
ATTORNEYS

United States Patent Office 3,378,092
Patented Apr. 16, 1968

3,378,092
STEPPER-TYPE VEHICLE WITH WAIST
STEERING MEANS
Bengt Erland Ilon, 43 Stromkarlsvagen,
Bromma, Sweden
Filed Oct. 20, 1965, Ser. No. 498,949
Claims priority, application Sweden, Feb. 23, 1965,
2,292/65
13 Claims. (Cl. 180—8)

ABSTRACT OF THE DISCLOSURE

A loading or tractor vehicle constructed for movement across untrafficable ground and including a wheel carriage of opposite sides of a vehicle body and means for alternately moving the wheel carriages through reciprocal movements forwardly and rearwardly of the direction of travel of the wheel.

---

The present invention refers to a loading or tractor vehicle, mainly to be used on untrafficable ground, in particular for difficult and troublesome transport operations in the forest or the like. More definitely the invention has for its object a loading or tractor vehicle provided with two or more supporting members and carried by the same on the ground.

The distinctive features of the vehicle according to the invention make it possible to use the vehicle on practically any ground, especially if the vehicle, as proposed by the invention, is provided with a so-called self-climbing wheel-undercarriage of one kind or the other.

Figure 1:
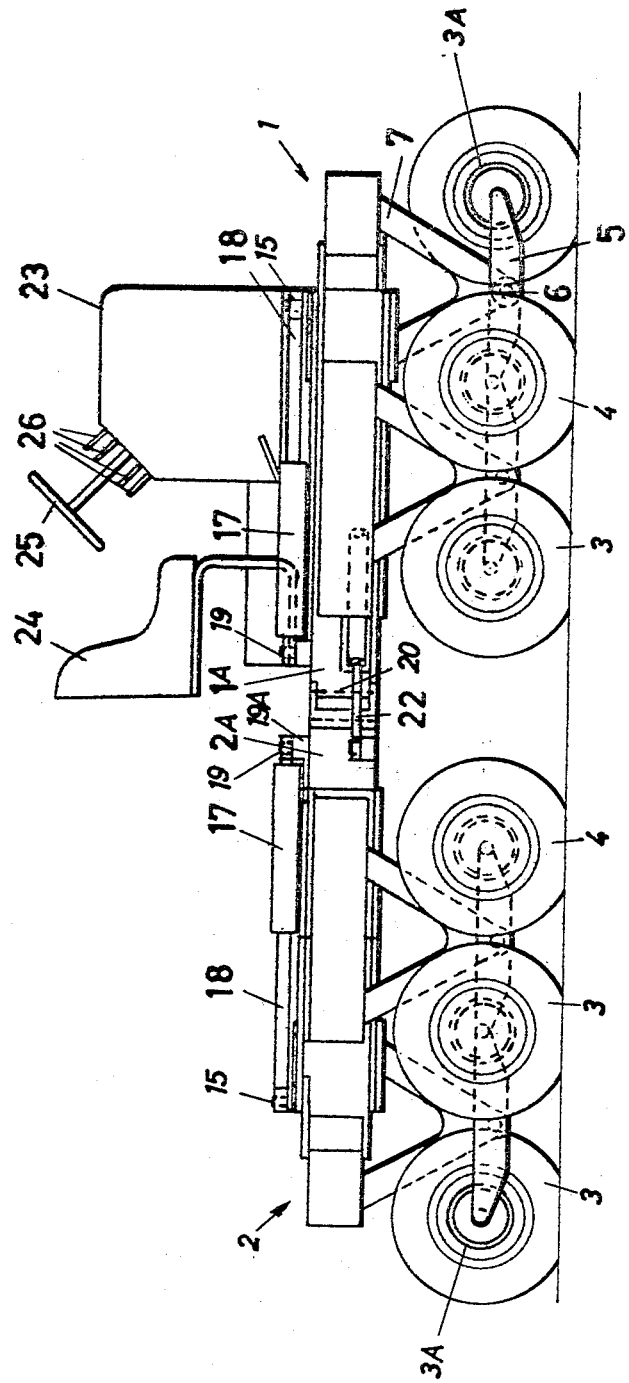
Figure 2:
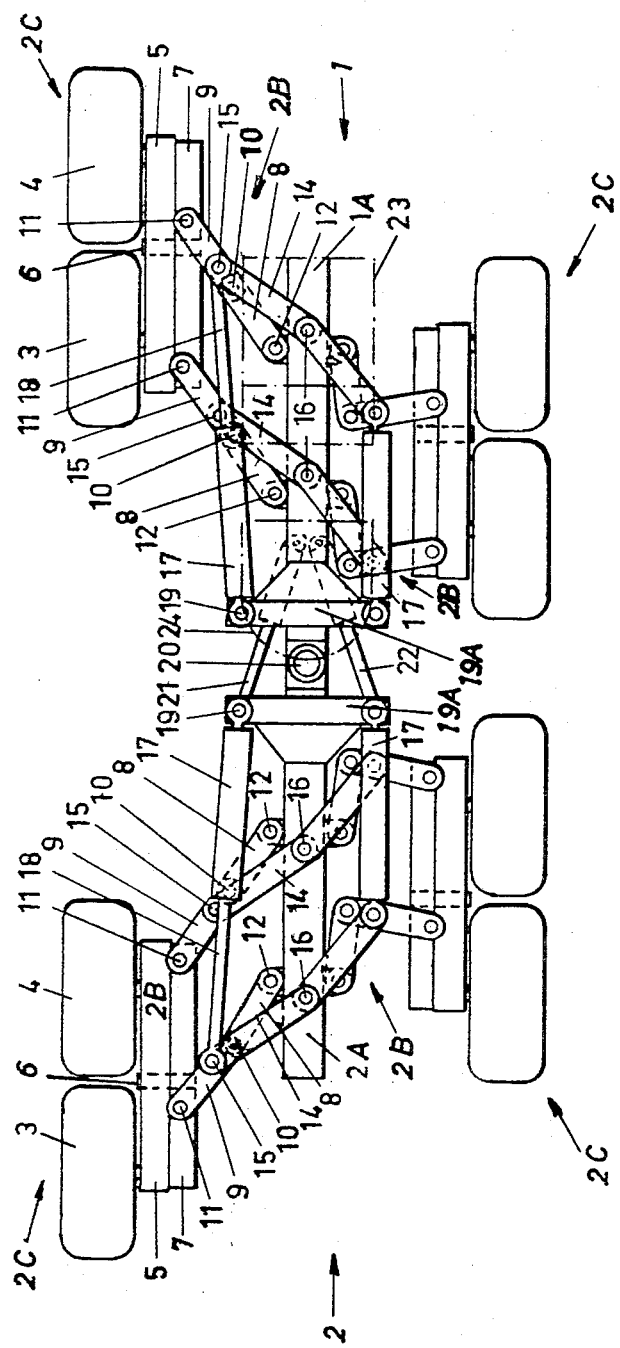
Figure 3:
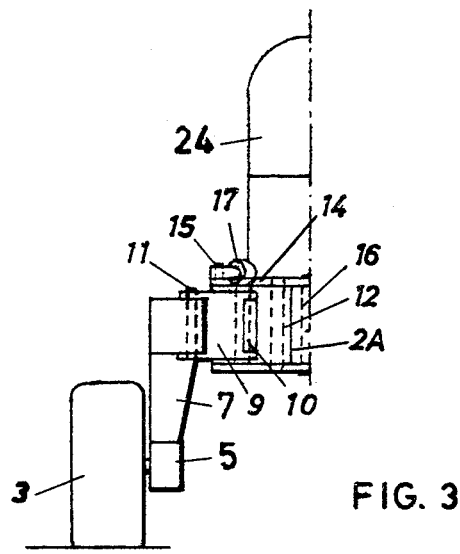
Figure 4:
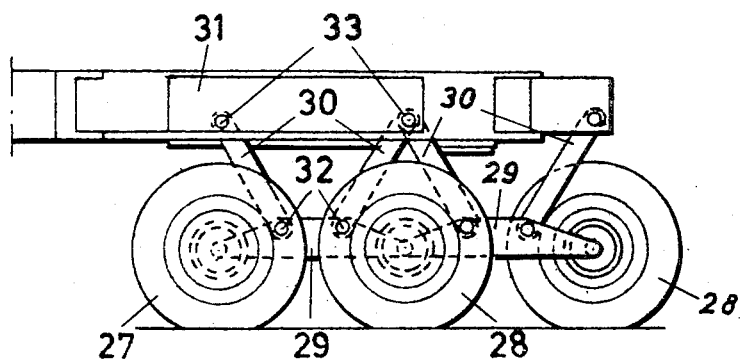
Figure 3A:
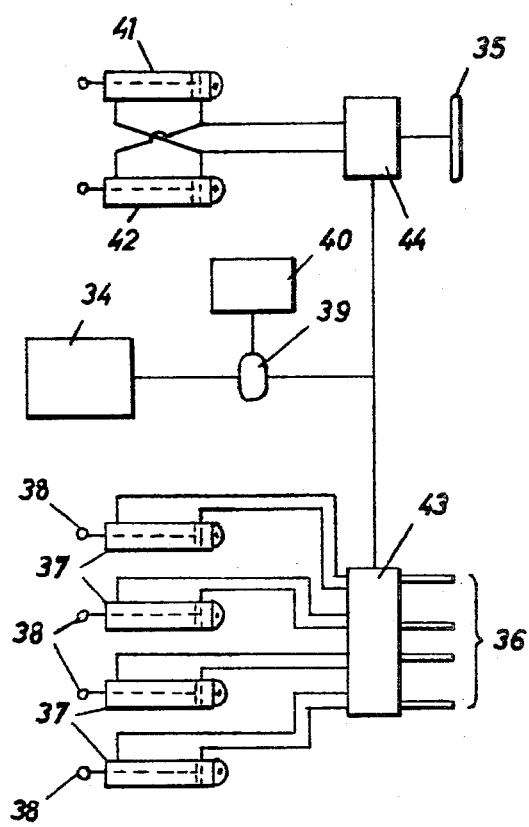

The invention will be described more in detail hereinafter with reference to the accompanying drawings, in which:

FIGURES 1 to 3 are diagrammatical views of a vehicle according to the invention;

FIGURE 1 being a side elevation of the vehicle;

FIGURE 2 a top plan view of the vehicle of FIGURE 1 with some equipment removed for clarity; and FIGURE 3 being a rear elevation of one half of the vehicle of FIGURE 1; and FIGURE 3A is a flow diagram for a hydraulic system of the vehicle; and FIGURE 4 is a diagrammatic side elevation of a wheel-under-carriage of the so-called self-climbing type for use in connection with the invention.

The vehicle as shown in FIGURES 1 to 3 comprises a front unit 1 and a rear unit 2 provided with central beams 1A and 2A, respectively. A swinging arm system 2B on each side of each beam is connected to a supporting member 2C, by which the unit is carried on the ground. Each supporting member 2C has a wheel carriage of the bogie type having two wheels 3, 4 which may, for example, be provided with pneumatic rubber tires. The wheels are mounted in either end of an arm 5, which is in turn pivotally mounted on a bracket 7 by means of a pivot 6 (FIGURE 1). The brackets 7 are by means of the swinging arm systems connected to the front central beam 1A and the rear central beam 2A, respectively. Each swinging arm system comprises a front arm and a rear arm, each formed by an inner and an outer link couple 8 and 9, respectively, which by means of pivots 10 are likely interconnected. The extreme ends of each outer link couple 9 are by means of pivots 11 pivotally mounted on the bracket 7, and the inner ends of the inner link couple 8 are by means of pivots 12 pivotally connected to a central beam 1A or 1B. One end of a guide rod 14 is pivotally connected to the outer link couple 9 by a pivot 15. The other end of the guide rod is pivotally connected to beam 1A or 1B as shown in FIGURE 2 by means of a pivot 16. The swinging arms form a parallelogrammatic connection between the brackets 7 and the beams, and by the effect of the guide rods the brackets are enabled to make translatory movements in the longitudinal direction of the vehicle with at least substantially a constant distance from the respective beams. To achieve such a translatory reciprocating movement each swinging arm system is provided with a driving means 17 comprising a piston in a cylinder, which may be operated pneumatically in both directions, the piston being connected to one of the pivots 15 by a piston rod 18. The other end of the driving means 17 is by means of a pivot 19 pivoted to a shoulder 19A projecting from the beam. The piston rods belonging to the front unit are facing the front while the piston rods of the rear unit are directed rearwards.

The front and rear units are interconnected by a pivot pin 20 as well as by two hydraulic systems 21, 22, pivotally mounted one on either side of the pivot pin. By means of the two systems 21, 22 the two units can be turned in relation to each other about the pivot pin, thus providing a so-called waist steering for altering the direction of travel of the vehicle.

The front unit 1 carries a driving source 23 for the vehicle, which suitably consists of a combustion engine and a hydraulic device pump driven by the same. In addition, the front unit is provided with the driver's seat 24, a steering wheel 25 and the control means 26 required. For the sake of simplicity the driving source and the driver's seat are only suggested by dash-dot-lines in FIGURE 2, while the steering wheel and the control means have been totally omitted. For the same reason the oil pipings for the various hydraulic systems, which should at least partly be flexible hoses, are neither shown in the drawing.

Each wheel is provided with a blocking or braking device 3A, which may be of any type known in the art. In case a blocking device is used, it should be of reversible type, so that it acts either in one or the other direction of rotation of the wheel, such types being also well-known. Either a blocking or a braking device of one type or the other is employed. It should be possible individually to operate the blocking or braking devices either manually or automatically by means of a special driving device, in the latter case the brakes preferably being applied or the wheels blocked in a predetermined succession, for example, cyclically by means of a program selecting device, from which the impulses can be transmitted to the braking or blocking devices hydraulically, electrically or mechanically in a manner known per se. By turning the steering wheel 25 in one direction or the other, pressure medium will be directed to the hydraulic systems 21 and 22 in such a manner that the angle between the front and the rear unit will be set to achieve the desired direction of travel.

The forward driving of the vehicle is brought about by letting each couple of wheels 3, 4 by means of the appertaining driving means perform reciprocating movements in relation to the beam between its two limit positions, the wheels during their movement forward rolling on the ground but in their reverse movement being prevented from doing so by means of the braking or blocking device. It is obvious that for the continuous driving of the vehicle at least one of the wheels must be in braking or blocking position, while at the same time moving rearwards in relation to the beam. By letting the wheels run through their reciprocal path successively as smooth as possible a movement is imparted to the vehicle. In case the wheels are instead allowed to move in pairs, so that two of the wheels move forwards while the other two wheels move backwards, the movement of the vehicle will become more pulsating. In certain cases it may be desirable to let all the four wheel couples work synchronously, whereby the total driving force from all the driving means is utilized simultaneously for driving the vehicle. This may, for example, come true, if the vehicle is used for trailing or the like. It is evident that by selecting a suitable program for the cooperation of the wheel-undercarriages the vehicle can be made to move, for example, imitating the various paces and jumping movements characterizing quadrupeds, i.e., walking, trotting, etc.

According to FIGURE 3A, 34 is the driving source which may be a combustion engine, 35 is the steering wheel and 36 the control means. The driving means 37, 38 for the translatory reciprocating movement of the swinging arm systems, and the steering means hydraulic systems 41, 42 are, by means of a hydraulic pump 39 which is mechanically connected to the driving source 34, supplied with pressure oil from an oil supply tank 40 via valve distribution means 43 and 44 which are regulated by the control means 36 and the steering wheel 35 respectively.

While the details of the control devices disclosed in FIGURE 3A will be apparent to those skilled in the art, reference is made to U.S. Patent Nos. 3,057,319 and 3,109,506 as illustrative of such devices.

In FIGURE 4 an elevation is shown of a portion of the lower part of the front unit of a loading or tractor vehicle according to the invention, provided with wheel-undercarriages of the so-called self-climbing type such as is disclosed in my copending United States application 319,-306, filed on Oct. 29, 1963, now Patent No. 3,235,278. Each carriage comprises a rear and a front wheel 27 and 28, respectively, mounted on either end of a rigid arm 29, which by means of two links 30 is suspended in a bracket 31, which by a swinging arm system of the same kind as in FIGURES 1 to 3 is connected to the central beam. The links are in this case with their ends pivoting on pivots 32, 33, the distance between the lower pivots 32 being shorter than that between the upper pivots 33.

Other types of carriages may also be used in connection with the loading or tractor vehicle according to the invention. Moreover, it is possible to use swinging arm systems of other embodiments than those described hereinbefore and illustrated in the drawings. For example, the links of the swinging arm system may be arranged to pivot in vertical planes, i.e., perpendicular to the wheel axles. However, the wheels will then move in arcuate paths in the vertical plane, thus causing hopping movements and great stress to the vehicle. Hence, it is generally of advantage to use a swinging arm system with the arms swinging in a horizontal plane, in particular as such swinging arm systems offer the special effect that they may be used in combination with wheel-undercarriages of the self-climbing type mentioned by means of which the vehicle will in the fullest sense of the words become a so-called cross-country type vehicle.

The loading and tractor vehicle may be provided with a loading platform or the like for carrying the load. However, it may also or only have the object of being a tractor for trailers or the like.

I claim:
1. A loading or tractor vehicle comprising a vehicle body, a pair of wheel means for supporting the vehicle body on the ground, an axle means for each of said wheel means, means mounting said wheel means on opposite sides of said vehicle body and guiding the same for rectilinear reciprocating movement forwardly and rearwardly relative to said vehicle body in the direction of travel of the vehicle, said mounting means including linkage means guiding each wheel means for movement in a path parallel to the direction of vehicle travel and to the wheel axle means, drive means for the vehicle, means connecting said drive means to said linkage means for effecting movement thereof to cause said movement of the wheel means, and braking means cooperable with each of the wheel means for restricting rotation thereof in one direction so as to prevent said wheel means from rolling on the ground during said reciprocating movement of the wheel means in one direction.

2. A vehicle according to claim 1 wherein said first-mentioned vehicle body, and said means associated therewith comprise a first unit, and including a second unit comprising the same kind of means as said first unit, said drive means being connected to the linkage means of said second unit for driving the same, and including a waist steering device pivotally interconnecting said second unit with said first unit.

3. A vehicle according to claim 2 wherein said drive means comprises an engine, a hydraulic device connected to said engine and a common source for all of the drive means connections to said linkage means.

4. A vehicle according to claim 2 wherein each of said wheel means comprises at least two wheel members.

5. A vehicle according to claim 1 in which the braking means for the wheel means are constructed and arranged to be actuated optionally to a braking position in the two limit positions of said reciprocating movements.

6. A vehicle according to claim 4 in which said wheel means are mounted for individual displacement in relation to the vehicle body between two limit positions in the direction of the travel of the vehicle, each of said wheel means being provided with an individual driving means for producing the reciprocating movement thereof.

7. A vehicle according to claim 5 including a control means for controlling the drive means connection to the linkage means for each wheel means for actuating the same in predetermined succession.

8. A vehicle according to claim 5 in which said linkage means for each of said wheel means comprises a swinging arm arrangement whereby the wheel means are at least substantially translatorily displaceable in their own main plane.

9. A vehicle according to claim 2 in which said drive means is pneumatic.

10. A vehicle according to claim 8 in which each of said swinging arm arrangements forms a parallelogram-like suspension device for the wheels.

11. A vehicle according to claim 10 wherein said swinging arm arrangements are constructed to swing in planes parallel to the wheel axle means.

12. A vehicle according to claim 11 wherein said mounting means comprises a wheel-undercarriage supported by said swinging arm arrangement.

13. A vehicle according to claim 12 wherein said wheel-undercarriages are of a self-climbing type.

References Cited

UNITED STATES PATENTS

| | | | |
|---|---|---|---|
| 2,673,616 | 3/1954 | Moores | 180—51 |
| 3,057,319 | 10/1962 | Wagner | 115—1 |
| 3,109,506 | 11/1963 | Schroter et al. | 180—8 |
| 3,208,544 | 9/1965 | Colvin | 180—51 |

FOREIGN PATENTS 646,351  11/1950  Great Britain.

LEO FRIAGLIA, *Primary Examiner.*